(12) United States Patent
Kim

(10) Patent No.: US 9,415,743 B2
(45) Date of Patent: Aug. 16, 2016

(54) AIRBAG APPARATUS

(71) Applicant: HYUNDAI MOBIS Co., Ltd., Yongin-si, Gyeonggi-do (KR)

(72) Inventor: Jae Hyun Kim, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/624,633

(22) Filed: Feb. 18, 2015

(65) Prior Publication Data

US 2015/0336534 A1  Nov. 26, 2015

(30) Foreign Application Priority Data

May 26, 2014  (KR) ......................... 10-2014-0063142

(51) Int. Cl.
  *B60R 21/276*  (2006.01)
  *B60R 21/237*  (2006.01)
  *B60R 21/239*  (2006.01)

(52) U.S. Cl.
  CPC ............. *B60R 21/276* (2013.01); *B60R 21/237* (2013.01); *B60R 21/239* (2013.01); *B60R 2021/2395* (2013.01)

(58) Field of Classification Search
  CPC .. B60R 21/239; B60R 21/237; B60R 21/276; B60R 2021/2395
  See application file for complete search history.

(56) References Cited

U.S. PATENT DOCUMENTS

| 5,492,363 | A  | * | 2/1996  | Hartmeyer    | B60R 21/239 280/738 |
| 5,704,639 | A  | * | 1/1998  | Cundill      | B60R 21/239 280/739 |
| 5,839,755 | A  | * | 11/1998 | Turnbull     | F16K 15/202 280/739 |
| 6,095,557 | A  | * | 8/2000  | Takimoto     | B60R 21/2338 280/739 |
| 6,276,716 | B1 | * | 8/2001  | Kato         | B60R 21/233 280/729 |
| 6,832,778 | B2 | * | 12/2004 | Pinsenschaum | B60R 21/233 280/739 |
| 7,264,268 | B2 | * | 9/2007  | Ehrke        | B60R 21/233 280/729 |
| 7,722,080 | B2 | * | 5/2010  | Rose         | B60R 21/2338 280/743.2 |
| 7,931,299 | B2 | * | 4/2011  | McFadden     | B60R 21/233 280/739 |

(Continued)

FOREIGN PATENT DOCUMENTS

| JP | 2001277991 A | 10/2001 |
| JP | 2011-173544 A | 9/2012 |
| KR | 10-0977598 B1 | 8/2013 |

*Primary Examiner* — Barry Gooden, Jr.
(74) *Attorney, Agent, or Firm* — Paratus Law Group, PLLC

(57) ABSTRACT

Provided is an airbag apparatus in which a discharge rate of gas discharged from an airbag is adjusted. To this end, the airbag apparatus according to the exemplary embodiment of the present invention includes: an airbag which has a vent hole through which gas is discharged; and a vent rate adjusting member which is coupled to the airbag while covering the vent hole, and adjusts a discharge rate of gas discharged through the vent hole, in which the vent rate adjusting member is folded and coupled to the airbag, and has a communicating hole, such that the communicating hole comes into communication with the vent hole when the vent rate adjusting member is unfolded by expansive force of the airbag.

11 Claims, 10 Drawing Sheets

(56) References Cited

U.S. PATENT DOCUMENTS

| | | | | |
|---|---|---|---|---|
| 9,187,056 | B1* | 11/2015 | Kwon | B60R 21/2338 |
| 9,199,602 | B1* | 12/2015 | Fischer | B60R 21/239 |
| 2004/0012179 | A1* | 1/2004 | Pinsenschaum | B60R 21/233 280/739 |
| 2006/0186655 | A1* | 8/2006 | Ehrke | B60R 21/233 280/743.1 |
| 2006/0290116 | A1* | 12/2006 | Bradburn | B60R 21/239 280/739 |
| 2007/0013177 | A1* | 1/2007 | Abe | B60R 21/239 280/739 |
| 2007/0108750 | A1* | 5/2007 | Bauer | B60R 21/233 280/740 |
| 2008/0073892 | A1* | 3/2008 | Rose | B60R 21/2338 280/739 |
| 2008/0079250 | A1* | 4/2008 | Boyle | B60R 21/233 280/739 |
| 2008/0203713 | A1* | 8/2008 | McFadden | B60R 21/233 280/739 |
| 2009/0001697 | A1* | 1/2009 | Carvalho Marques | B60R 21/239 280/736 |
| 2009/0267333 | A1* | 10/2009 | Pittiglio | B60R 21/239 280/740 |
| 2010/0253054 | A1* | 10/2010 | Chida | B60R 21/239 280/736 |
| 2012/0068444 | A1* | 3/2012 | Suzuki | B60R 21/239 280/739 |
| 2015/0336534 | A1* | 11/2015 | Kim | B60R 21/276 280/742 |

* cited by examiner

AIRBAG APPARATUS

CROSS-REFERENCE TO RELATED APPLICATIONS

The present application claims priority to Korean Patent Application Number 10-2014-0063142 filed May 26, 2014, the entire contents of which the application is incorporated herein for all purposes by this reference.

TECHNICAL FIELD

The present invention relates to an airbag apparatus, and more particularly, to an airbag apparatus installed in front of a front passenger seat.

BACKGROUND

In general, various occupants such as children, kids, or female persons whom are smaller than a general adult size as well as adult persons of general size are seated in front passenger seats.

Therefore, a vent rate adjusting member, which adjusts a discharge rate of gas discharged from an airbag and varies deployment pressure of the airbag based on the type of occupant, is installed in the airbag for a front passenger seat.

The vent rate adjusting member is generally classified into a low risk deployment (LRD) vent, and an active vent.

The LRD vent is installed for the purpose of discharging gas when the airbag is initially inflated, so as to reduce initial deployment pressure of the airbag, and blocking discharge of gas after the airbag is fully inflated, so as to allow the airbag to maintain appropriate deployment pressure, thereby preventing a neck of a child from being injured due to excessive deployment pressure of the airbag when the airbag is initially deployed.

On the contrary to the LRD vent, the active vent is installed for the purpose of blocking discharge of gas when the airbag is initially deployed, so as to allow the airbag to be quickly deployed, and discharging gas after the airbag is fully inflated, so as to allow the airbag to maintain appropriate deployment pressure, thereby protecting an adult person by maintaining appropriate pressure at an appropriate point of time.

However, because both of the LRD vent and the active vent are installed in the airbag for a front passenger seat, there are problems in that the number of processes required to manufacture the airbag is increased, and costs are increased.

SUMMARY

The present invention has been made in an effort to provide an airbag apparatus in which a discharge rate of gas discharged from an airbag is adjusted.

Technical problems of the present invention are not limited to the aforementioned technical problem, and other technical problems, which are not mentioned above, may be clearly understood by those skilled in the art from the following descriptions.

An exemplary embodiment of the present invention provides an airbag apparatus including: an airbag which has a vent hole through which gas is discharged; and a vent rate adjusting member which is coupled to the airbag while covering the vent hole, and adjusts a discharge rate of gas discharged through the vent hole, in which the vent rate adjusting member is folded and coupled to the airbag, and has a communicating hole, such that the communicating hole comes into communication with the vent hole when the vent rate adjusting member is unfolded by expansive force of the airbag.

Other detailed matters of the exemplary embodiment are included in the detailed description and the drawings.

According to the airbag apparatus according to the present invention, gas in the airbag is discharged to the outside when the airbag is initially deployed, thereby preventing a child from being injured due to initial deployment pressure of the airbag.

Gas in the airbag is not discharged to the outside after the airbag is fully inflated, thereby allowing the airbag to protect an adult person by maintaining appropriate pressure.

Gas in the airbag is discharged to the outside when the airbag is pressed by the occupant after the airbag is fully inflated, thereby maintaining pressure that is appropriate for the airbag to protect an adult person.

The effect of the present invention is not limited to the aforementioned effect, and other effects, which are not mentioned above, will be clearly understood by those skilled in the art from the claims.

DETAILED DESCRIPTION

Figure 1:
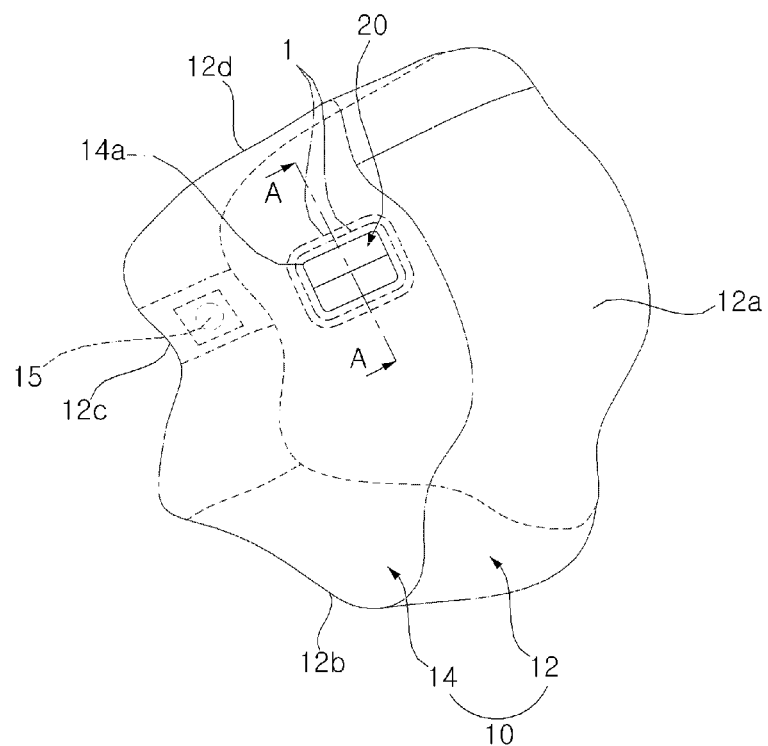
FIG. 1 is a perspective view illustrating an airbag apparatus according to a first exemplary embodiment of the present invention.

Various advantages and features of the present invention and methods of achieving the advantages and features will be clear with reference to exemplary embodiments described below in detail together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an airbag apparatus according to exemplary embodiments of the present invention will be described with reference to the drawings.

Figure 2:
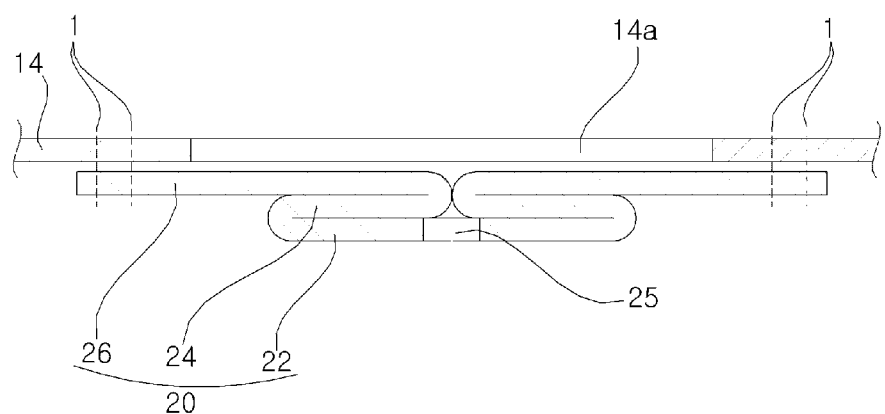
FIG. 2 is a cross-sectional view taken along line A-A of FIG. 1.

FIG. 1 is a perspective view illustrating an airbag apparatus according to a first exemplary embodiment of the present invention, and FIG. 2 is a cross-sectional view taken along line A-A of FIG. 1.

Referring to FIGS. 1 and 2, the airbag apparatus according to the exemplary embodiment of the present invention includes an airbag 10 which is inflated and deployed when gas generated by an inflator (not illustrated) flows into the airbag 10. An inflator insertion hole 15 into which a head portion of the inflator is inserted is formed in a rear surface 12c of the airbag 10. That is, the head portion of the inflator is inserted into the inflator insertion hole 15, and a portion of the inflator, which is not inserted into the inflator insertion hole 15, is coupled to the outside of the rear surface 12c of the airbag 10.

When the airbag 10 is inflated, a front surface 12a of the airbag 10 comes into contact with an occupant, a lower surface 12b of the airbag 10 comes into contact with an instrument panel, and an upper surface 12d of the airbag 10 comes into contact with a windshield. Here, the instrument panel is a panel that is disposed in front of a driver seat and a front passenger seat so as to be spaced apart from the driver seat and the front passenger seat. The instrument panel refers to a panel which is elongated leftward and rightward and on which instruments, a steering column, an audio system, an air conditioning system, an airbag apparatus for a front passenger seat, and the like are installed. In addition, the windshield refers to front glass of a vehicle.

The airbag 10 is manufactured by sewing three panels made of a flexible material. That is, the airbag 10 includes a main panel 12 which is disposed at a center and comes into contact with the occupant when the airbag 10 is inflated, and side panels 14 which are coupled to both sides of the main panel 12, respectively. The airbag 10 is completely manufactured by sewing the circumferences of the side panels 14 on the main panel 12. The airbag 10 according to the exemplary embodiment is an airbag for a front passenger seat. In the following description, the side panel 14 may mean a side surface of the airbag 10.

Both of the side panels 14 have a vent hole 14a through which gas flowing into the airbag 10 is discharged. The vent hole 14a is formed in a quadrangular shape.

A vent rate adjusting member 20, which adjusts a discharge rate of gas discharged through the vent hole 14a, is installed on the side panel 14. The vent rate adjusting member 20 is coupled to the side panel 14 while covering the vent hole 14a inside the side panel 14. That is, the vent rate adjusting member 20 is disposed in the airbag 10. FIG. 1 illustrates a single vent rate adjusting member 20, but the vent rate adjusting members 20 are disposed at both sides of the airbag 10 by being coupled to both of the side panels 14, respectively, with one on each side.

The vent rate adjusting member 20 may be formed in a quadrangular plate shape having an area enough to cover the quadrangular vent hole 14a.

The vent rate adjusting member 20 is made of a flexible material so as to be foldable. The vent rate adjusting member 20 may be made of the same material as the airbag 10. The vent rate adjusting member 20 is folded and then coupled to the side panel 14 by sewing the circumference of the vent rate adjusting member 20 on the side panel 14 using a sewing thread 1.

A communicating hole 25 is formed in the vent rate adjusting member 20. When the vent rate adjusting member 20 is unfolded by expansive force of the airbag 10, the communicating hole 25 comes into communication with the vent hole 14a formed in the side panel 14. When the communicating hole 25 comes into communication with the vent hole 14a as described above, gas in the airbag 10 may sequentially pass through the communicating hole 25 and the vent hole 14a and then be discharged to the outside of the airbag 10.

The vent rate adjusting member 20 includes a central portion 22 which is disposed at a center, first folded portions 24 which overlap the central portion 22, and second folded portions 26 which overlap the first folded portions 24.

The communicating hole 25 is formed at a center of the central portion 22. When the first folded portion 24 is unfolded from the central portion 22, the communicating hole 25 comes into communication with the vent hole 14a formed in the side panel 14, such that gas in the airbag 10 may sequentially pass through the communicating hole 25 and the vent hole 14a and then be discharged to the outside of the airbag 10.

The circumference of the second folded portion 26 is coupled to the side panel 14 by being sewed on the side panel 14 using the sewing thread 1. Therefore, the vent rate adjusting member 20 shields the vent hole 14a formed in the side panel 14, such that gas in the airbag 10 may be discharged to the outside of the airbag 10 only when the communicating hole 25 formed in the central portion 22 comes into communication with the vent hole 14a formed in the side panel 14.

Figure 3:
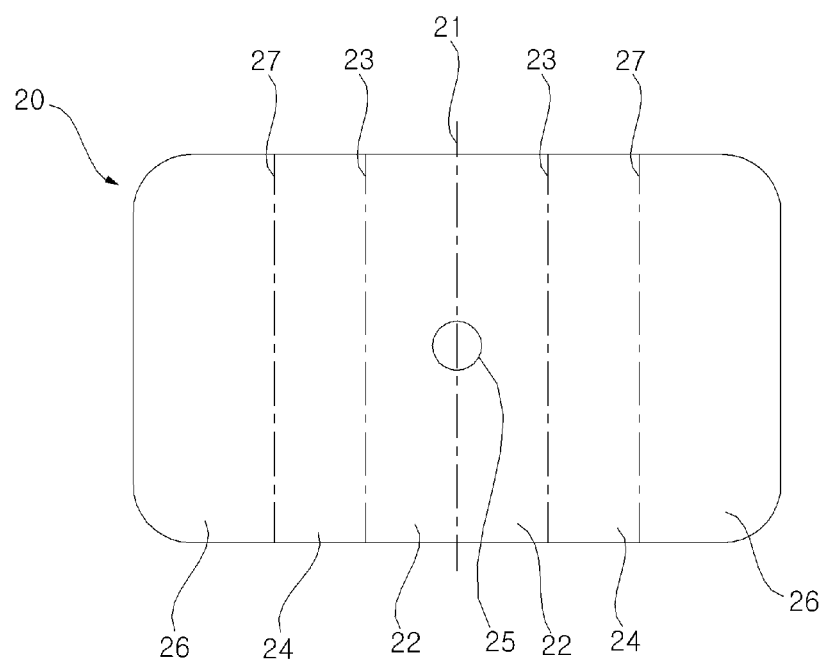
FIG. 3 is a view illustrating a state in which a vent rate adjusting member illustrated in FIG. 1 is unfolded before being coupled to an airbag.

FIG. 3 is a view illustrating a state in which the vent rate adjusting member illustrated in FIG. 1 is unfolded before being coupled to the airbag.

Referring to FIG. 3, first folding lines 23 are disposed at both sides of the central portion 22 of the vent rate adjusting member 20, respectively. The first folding line 23 is a reference line along which the first folded portion 24 is folded, and may be an actual line drawn on the vent rate adjusting member 20, or may be a virtual line. The first folding lines 23 formed at both sides of the central portion 22 are disposed in parallel with each other.

Second folding lines 27 are disposed at both sides of the first folded portions 24 of the vent rate adjusting member 20. The second folding line 27 is a reference line along which the second folded portion 26 is folded, and may be an actual line drawn on the vent rate adjusting member 20, or may be a virtual line. The second folding lines 27 formed at both sides of the first folded portions 24 are disposed in parallel with each other.

The first folding line 23 and the second folding line 27 are also disposed in parallel with each other.

The communicating hole 25 is formed at a center of the central portion 22. The communicating hole 25, which is at least one, may be formed on a straight line 21 that runs through the center of the central portion 22. Here, the straight line 21 running through the center of the central portion 22 runs through the center of the central portion 22 so as to be in parallel with the first folding line 23 and the second folding line 27.

The configuration in which the single communicating hole 25 is formed on the straight line 21 running through the center of the central portion 22 is illustrated, but a plurality of communicating holes 25 may be formed on the straight line 21 running through the center of the central portion 22. That is, the communicating hole 25, which is at least one, may be formed on the straight line 21 that runs through the center of the central portion 22. Of course, it is most preferable that the communicating hole 25 is formed on the straight line 21 running through the center of the central portion 22, but the communicating hole 25, which is at least one, may be formed at any position of the central portion 22 as long as the communicating hole 25 may be opened or closed by the first folded portion 24 and the second folded portion 26.

In a state in which the vent rate adjusting member 20 is fully unfolded, the first folded portions 24 are disposed at both sides of the central portion 22, respectively, and the second folded portions 26 are disposed at both sides of the first folded portions 24, respectively.

Figure 4:
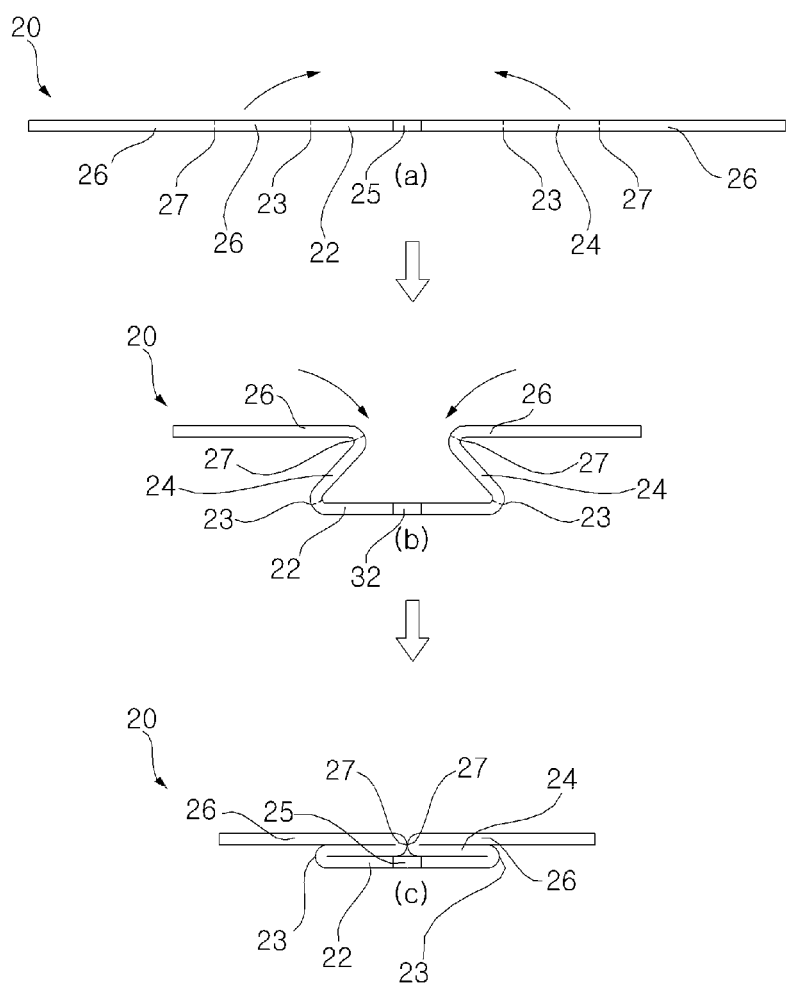
FIG. 4 is a view illustrating a sequence of folding the vent rate adjusting member.

FIG. 4 is a view illustrating a sequence of folding the vent rate adjusting member. Here, FIG. 4A illustrates a state in which the vent rate adjusting member 20 is fully unfolded before being coupled to the airbag 10, FIG. 4C illustrates a state in which the vent rate adjusting member 20 is fully folded, and the circumference of the vent rate adjusting member 20 is coupled to an inner surface of the airbag 10 in a state illustrated in FIG. 4C.

A sequence of folding the vent rate adjusting member 20 will be described below with reference to FIG. 4.

First, the vent rate adjusting member 20 is spread out as illustrated in FIG. 4A.

Thereafter, as illustrated in FIG. 4B, the first folded portions 24 are folded upward toward the center of the central portion 22 along the first folding lines 23, and the second folded portions 26 are folded along the second folding lines 27 in a direction opposite to the direction in which the first folded portions 24 are folded.

Accordingly, as illustrated in FIG. 4C, the first folded portions 24 overlap the central portion 22, and the second folded portions 26 overlap the first folded portions 24. In this state, the second folding lines 27, which are formed at both sides of the first folded portions 24, respectively, are in direct contact with each other, and disposed to run through the center of the central portion 22.

Thereafter, the vent rate adjusting member 20 comes into direct contact with the side panel 14 while the vent rate adjusting member 20 covers the vent hole 14a formed in the side panel 14, and then the circumferences of the second folded portions 26 are sewed on and coupled to the side panel 14 using the sewing thread 1.

An operation of the airbag apparatus according to the first exemplary embodiment of the present invention, which is configured as described above, will be described below.

Figure 5:
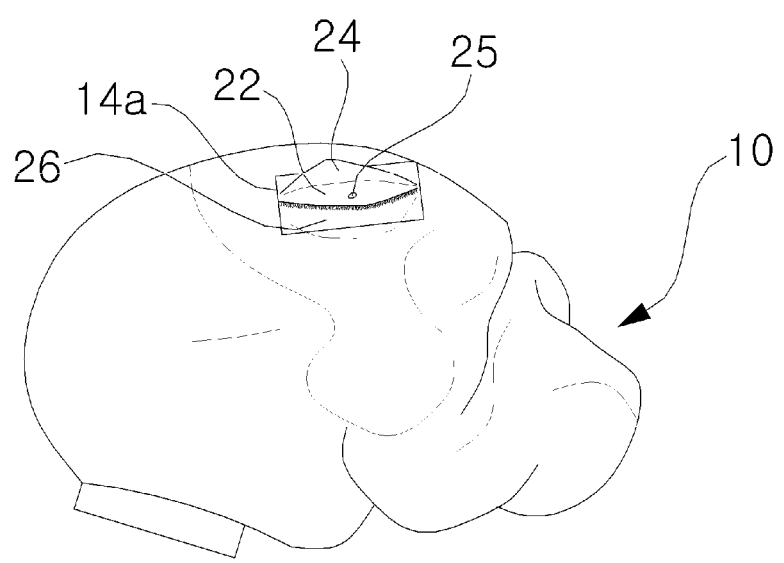
FIG. 5 is a view illustrating a state in which the airbag of the airbag apparatus according to the first exemplary embodiment of the present invention is initially deployed.
Figure 6:
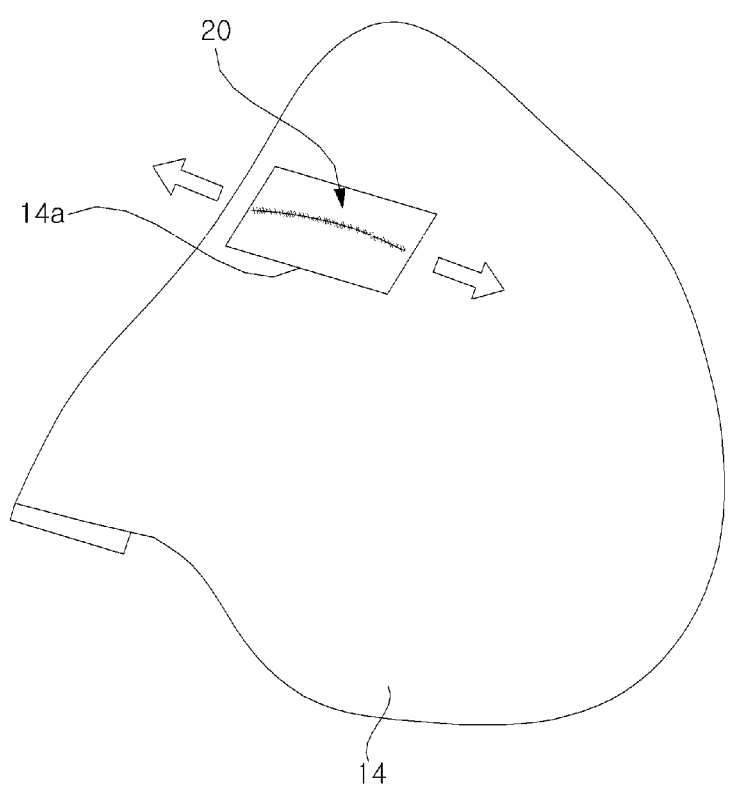
FIG. 6 is a view illustrating a state in which the airbag of the airbag apparatus according to the first exemplary embodiment of the present invention is fully inflated.
Figure 7:
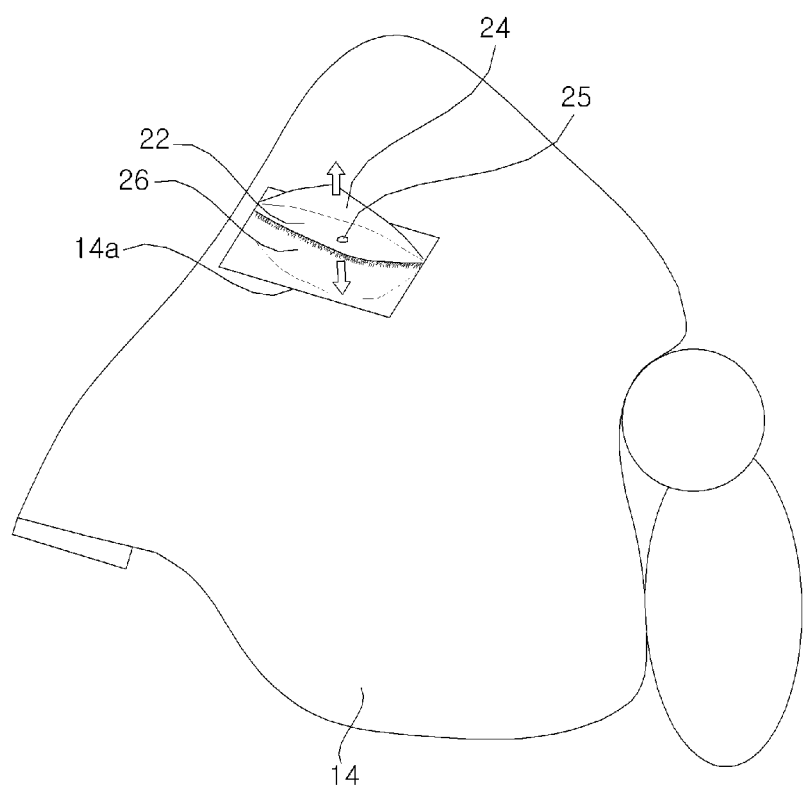
FIG. 7 is a view illustrating a state in which the airbag of the airbag apparatus according to the first exemplary embodiment of the present invention is pressed by an occupant after being fully inflated.

FIG. 5 is a view illustrating a state in which the airbag of the airbag apparatus according to the first exemplary embodiment of the present invention is initially deployed, FIG. 6 is a view illustrating a state in which the airbag of the airbag apparatus according to the first exemplary embodiment of the present invention is fully inflated, and FIG. 7 is a view illustrating a state in which the airbag of the airbag apparatus according to the first exemplary embodiment of the present invention is pressed by the occupant after being fully inflated.

Referring to FIGS. 4 and 5, when the airbag 10 is initially deployed, the airbag 10 is not tightened but wrinkled. Therefore, while the first folded portions 24 are unfolded from the central portion 22 by pressure of gas that is discharged through the communicating hole 25 formed in the central portion 22, the first folded portions 24 and the second folded portions 26 protrude to the outside of the side panel 14 through the vent hole 14a, and the second folding lines 27 become spaced apart from each other, such that the communicating hole 25 is opened. Therefore, since the communicating hole 25 comes into communication with the vent hole 14a, gas in the airbag 10 sequentially passes through the communicating hole 25 and the vent hole 14a and then is discharged to the outside of the airbag 10.

As described above, the airbag apparatus according to the first exemplary embodiment of the present invention discharges gas in the airbag 10 when the airbag 10 is initially deployed, thereby preventing a child from being injured due to initial deployment pressure of the airbag 10 when the child is seated in the front passenger seat.

Referring to FIGS. 4 and 6, after the airbag 10 is fully inflated, the airbag 10 is tightened. Therefore, because expansive force of the airbag 10, which is applied in a direction indicated by the arrow, is higher than pressure of gas discharged through the communicating hole 25 formed in the central portion 22, the first folded portions 24 overlap the central portion 22 again, and the second folded portions 26 overlap the first folded portions 24 again, such that a portion between the second folding lines 27 is closed, and the communicating hole 25 is closed. Therefore, gas in the airbag 10 is not discharged to the outside of the airbag 10.

As described above, in the airbag apparatus according to the first exemplary embodiment of the present invention, gas in the airbag 10 is not discharged to the outside after the airbag 10 is fully inflated, thereby protecting an adult person by maintaining appropriate pressure in the airbag 10 when the adult person is seated in the front passenger seat.

Referring to FIGS. 4 and 7, because pressure of gas discharged through the communicating hole 25 formed in the central portion 22 is higher than expansive force of the airbag 10 when the airbag 10 is pressed by the occupant (here, the adult person) after being fully deployed, the first folded portions 24 are unfolded from the central portion 22 again, and the first folded portions 24 and the second folded portions 26 protrude to the outside of the side panel 14 through the vent hole 14a again, such that the second folding lines 27 become spaced apart from each other, and the communicating hole 25 is opened. Therefore, since the communicating hole 25 comes into communication with the vent hole 14a, gas in the airbag 10 sequentially passes through the communicating hole 25 and the vent hole 14a and then is discharged to the outside of the airbag 10.

As described above, in the airbag apparatus according to the first exemplary embodiment of the present invention, gas in the airbag 10 is discharged to the outside when the airbag 10 is pressed by the occupant after being fully inflated, thereby maintaining pressure that is appropriate for the airbag 10 to protect the adult person when the adult person is seated in the front passenger seat.

Figure 8:
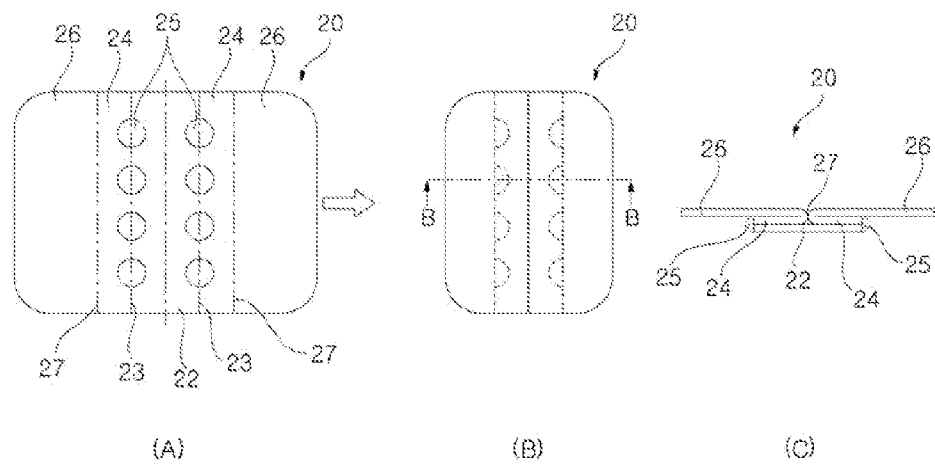
FIG. 8 is a view illustrating a vent rate adjusting member of an airbag apparatus according to a second exemplary embodiment of the present invention.

FIG. 8 is a view illustrating a vent rate adjusting member of an airbag apparatus according to a second exemplary embodiment of the present invention. Hereinafter, like reference numerals refer to constituent elements identical to those of the aforementioned first exemplary embodiment, a description thereof will be omitted, and only differences between the exemplary embodiments will be described. FIG. 8A illustrates a state in which the vent rate adjusting member 20 is fully unfolded before being coupled to the airbag 10, FIG. 8B illustrates a state in which the vent rate adjusting member 20 is folded, and FIG. 8C illustrates a cross-sectional view taken along line B-B of FIG. 8B.

Referring to FIG. 8A, it can be seen that the vent rate adjusting member 20 of the airbag apparatus according to the second exemplary embodiment of the present invention differs from the vent rate adjusting member according to the aforementioned first exemplary embodiment. That is, in the aforementioned first exemplary embodiment, the communicating hole 25 is formed at the center of the central portion 22, but in the second exemplary embodiment, the communicating hole 25 is formed on the first folding line 23. The communicating holes 25 are formed on all of the first folding lines 23 disposed at both sides of the central portion 22. The configuration in which four communicating holes 25 are formed on each of the first folding lines 23 is illustrated, but the communicating hole 25, which is at least one, may be formed on each of the first folding lines 23.

When the vent rate adjusting member 20 of the airbag apparatus according to the second exemplary embodiment of the present invention is folded in the same manner as the vent rate adjusting member according to the aforementioned first exemplary embodiment, the vent rate adjusting member 20 comes to the states illustrated in FIGS. 8B and 8C.

Figure 9:
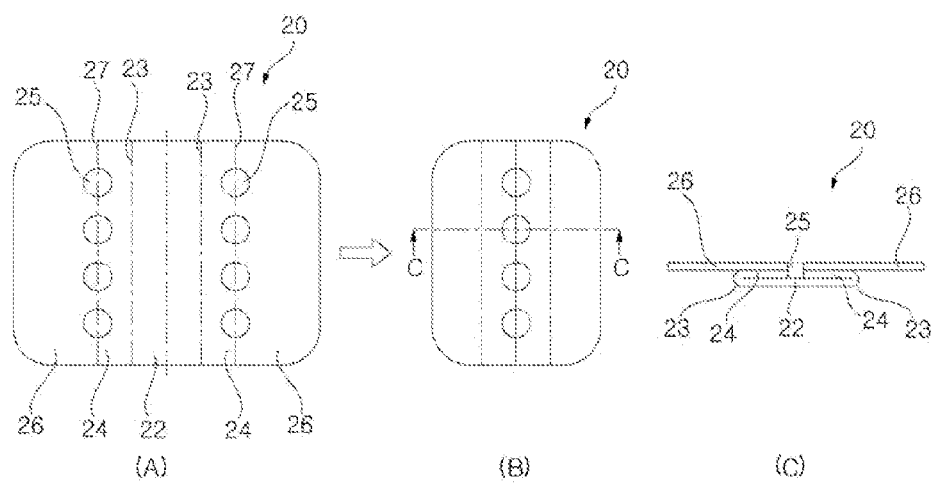
FIG. 9 is a view illustrating a vent rate adjusting member of an airbag apparatus according to a third exemplary embodiment of the present invention.

FIG. 9 is a view illustrating a vent rate adjusting member of an airbag apparatus according to a third exemplary embodiment of the present invention. Hereinafter, like reference numerals refer to constituent elements identical to those of the aforementioned first exemplary embodiment, a description thereof will be omitted, and only differences between the exemplary embodiments will be described. FIG. 9A illustrates a state in which the vent rate adjusting member 20 is fully unfolded before being coupled to the airbag 10, FIG. 9B illustrates a state in which the vent rate adjusting member 20 is folded, and FIG. 9C illustrates a cross-sectional view taken along line C-C of FIG. 9B.

Referring to FIG. 9A, it can be seen that the vent rate adjusting member 20 of the airbag apparatus according to the third exemplary embodiment of the present invention differs from the vent rate adjusting member according to the aforementioned first exemplary embodiment. That is, in the aforementioned first exemplary embodiment, the communicating hole 25 is formed at the center of the central portion 22, but in the third exemplary embodiment, the communicating hole 25 is formed on the second folding line 27. The communicating holes 25 are formed on all of the second folding lines 27 disposed at both sides of the first folded portions 24. The configuration in which four communicating holes 25 are formed on each of the second folding lines 27 is illustrated, but the communicating hole 25, which is at least one, may be formed on each of the second folding lines 27.

When the vent rate adjusting member 20 of the airbag apparatus according to the third exemplary embodiment of the present invention is folded in the same manner as the vent rate adjusting member according to the aforementioned first exemplary embodiment, the vent rate adjusting member 20 comes to the states illustrated in FIGS. 9B and 9C.

Figure 10:
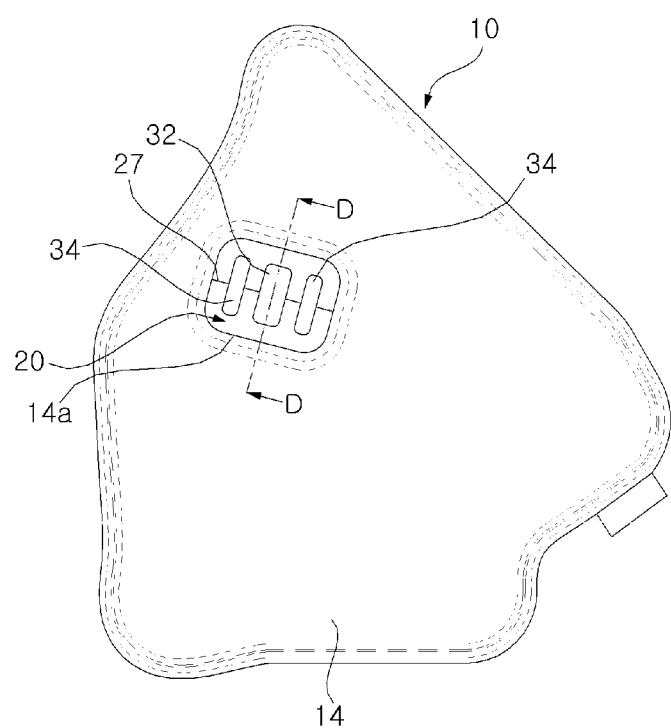
FIG. 10 is a side view illustrating an airbag apparatus according to a fourth exemplary embodiment of the present invention.
Figure 11:
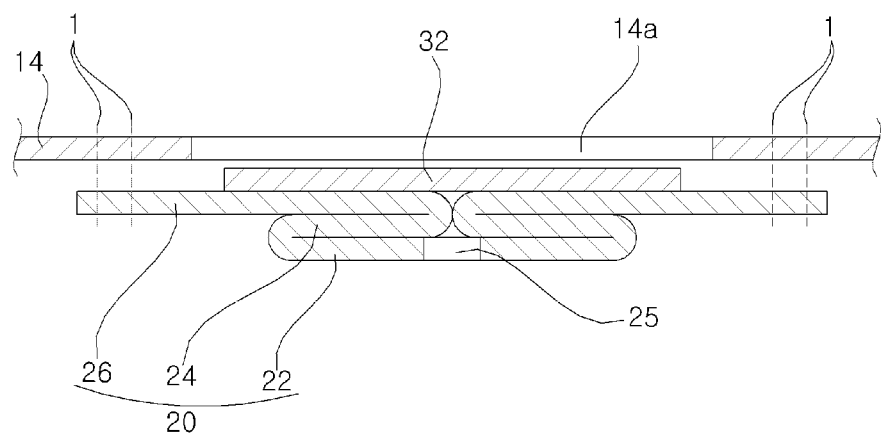
FIG. 11 is a cross-sectional view taken along line D-D of FIG. 10.

FIG. 10 is a side view illustrating an airbag apparatus according to a fourth exemplary embodiment of the present invention, and FIG. 11 is a cross-sectional view taken along line D-D of FIG. 10. Hereinafter, like reference numerals refer to constituent elements identical to those of the aforementioned first exemplary embodiment, a description thereof will be omitted, and only differences between the exemplary embodiments will be described.

Referring to FIGS. 10 and 11, it can be seen that the vent rate adjusting member 20 of the airbag apparatus according to the fourth exemplary embodiment of the present invention differs from the vent rate adjusting member according to the aforementioned first exemplary embodiment. That is, in comparison with the aforementioned first exemplary embodiment, the vent rate adjusting member 20 of the airbag apparatus according to the fourth exemplary embodiment of the present invention further includes elastic members 32 and 34. In the exemplary embodiment, bands, which have elastic force and can be extended by expansive force of the airbag 10 and then restored, are used as the elastic members 32 and 34.

The elastic members 32 and 34 are disposed across the second folding lines 27, and both ends of the elastic members 32 and 34 are coupled to the second folded portions 26. In more detail, one end of each of the elastic members 32 and 34 is coupled to the second folded portion 26 disposed at one side of the first folded portions 24, and the other end of each of the elastic members 32 and 34 is coupled to the second folded portion 26 disposed at the other side of the first folded portions 24.

When the first folded portions 24 begin to be excessively unfolded from the central portion 22 by expansive force of the airbag 10, the elastic members 32 and 34 generate elastic force that pulls the first folded portions 24 in directions opposite to the directions in which the first folded portions 24 are unfolded from the central portion 22. Therefore, the elastic members 32 and 34 prevent the first folded portion 24 from being excessively unfolded from the central portion 22, thereby preventing gas in the airbag 10 from being discharged at an excessive rate.

The elastic members 32 and 34 include a first elastic member 32 and second elastic members 34, which have different elastic coefficients. In the exemplary embodiment, the first elastic member 32 is formed to be higher in elastic coefficient than the second elastic member 34. Two second elastic members 34 are provided. A single first elastic member 32 is provided and disposed between the second elastic members 34.

As described above, according to the airbag apparatus according to the present invention, gas in the airbag 10 is discharged to the outside when the airbag 10 is initially deployed, thereby preventing a child from being injured due to initial deployment pressure of the airbag 10.

Gas in the airbag 10 is not discharged to the outside after the airbag is fully inflated, thereby allowing the airbag 10 to protect an adult person by maintaining appropriate pressure.

Gas in the airbag 10 is discharged to the outside when the airbag 10 is pressed by the occupant after the airbag 10 is fully inflated, thereby maintaining pressure that is appropriate for the airbag 10 to protect an adult person.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning of the scope of the claims, the scope of the claims, and the equivalents thereto, are included in the scope of the present invention.

What is claimed is:

1. An airbag apparatus comprising:
   an airbag which has a vent hole through which gas is discharged; and
   a vent rate adjusting member which is coupled to the airbag while covering the vent hole, and adjusts a discharge rate of the gas discharged through the vent hole,
   wherein the vent rate adjusting member is folded and coupled to the airbag, and has a communicating hole, such that the communicating hole comes into communication with the vent hole when the vent rate adjusting member is unfolded by expansive force of the airbag,
   wherein the vent rate adjusting member includes:
   a central portion;

first folded portions which are folded along first folding lines that are disposed at both sides of the central portion, and overlap the central portion; and second folded portions which are folded along second folding lines that are disposed at both sides of the first folded portions, overlap the first folded portions, and are coupled to the airbag.

2. The airbag apparatus of claim 1, wherein the communicating hole, which is at least one, is formed on the first folding line.

3. The airbag apparatus of claim 1, wherein the communicating hole, which is at least one, is formed on the second folding line.

4. The airbag apparatus of claim 1, wherein the first folded portions are unfolded from the central portion when the airbag is initially inflated, such that the communicating hole comes into communication with the vent hole, the first folded portions overlap the central portion when the airbag is fully inflated, such that the communicating hole is shielded, and the first folded portions are unfolded from the central portion when the airbag is pressed by an occupant after being fully inflated, such that the communicating hole comes into communication with the vent hole.

5. The airbag apparatus of claim 1, wherein when the first folded portions are unfolded from the central portion, the first folded portions and the second folded portions protrude to the outside of the airbag through the vent hole.

6. The airbag apparatus of claim 1, wherein both of the first folding lines are disposed in parallel with each other, and both of the second folding lines are disposed in parallel with each other.

7. The airbag apparatus of claim 6, wherein both of the second folding lines run through a center of the central portion.

8. The airbag apparatus of claim 1, wherein the communicating hole, which is at least one, is formed in the central portion.

9. The airbag apparatus of claim 8, wherein the communicating hole is formed on a straight line that runs through a center of the central portion so as to be in parallel with the first folding lines and the second folding lines.

10. The airbag apparatus of claim 1, further comprising:

an elastic member which is coupled to the second folded portion, and has elastic force that pulls the first folded portion in a direction opposite to a direction in which the first folded portion is unfolded from the central portion.

11. The airbag apparatus of claim 10, wherein the elastic member includes a first elastic member, and a second elastic member having an elastic coefficient different from an elastic coefficient of the first elastic member.

* * * * *